United States Patent
Chen

(10) Patent No.: US 10,568,177 B2
(45) Date of Patent: Feb. 18, 2020

(54) LIGHTING APPARATUS AND LIGHT EMITTING MODULE

(71) Applicant: XIAMEN ECO LIGHTING CO. LTD., Xiamen (CN)

(72) Inventor: Yanbiao Chen, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 12 days.

(21) Appl. No.: 15/480,769

(22) Filed: Apr. 6, 2017

(65) Prior Publication Data

US 2018/0249546 A1 Aug. 30, 2018

(30) Foreign Application Priority Data

Feb. 28, 2017 (CN) .......................... 2017 1 01143059

(51) Int. Cl.
| | | |
|---|---|---|
| H05B 33/08 | (2006.01) | |
| F21K 9/238 | (2016.01) | |
| F21K 9/64 | (2016.01) | |
| F21K 9/232 | (2016.01) | |
| F21Y 103/10 | (2016.01) | |
| F21Y 115/10 | (2016.01) | |

(52) U.S. Cl.
CPC ......... H05B 33/0857 (2013.01); F21K 9/232 (2016.08); F21K 9/238 (2016.08); F21K 9/64 (2016.08); H05B 33/0821 (2013.01); F21Y 2103/10 (2016.08); F21Y 2115/10 (2016.08)

(58) Field of Classification Search
None
See application file for complete search history.

(56) References Cited

U.S. PATENT DOCUMENTS

| | | | | |
|---|---|---|---|---|
| 2013/0141013 | A1* | 6/2013 | Kodama | H05B 33/0857 315/294 |
| 2013/0328503 | A1* | 12/2013 | Toda | H05B 37/02 315/297 |
| 2014/0159612 | A1* | 6/2014 | Tong | H01L 25/0753 315/297 |
| 2016/0273717 | A1* | 9/2016 | Krames | G02B 6/0073 |

FOREIGN PATENT DOCUMENTS

CN 206525004 U * 9/2017

* cited by examiner

*Primary Examiner* — Dedei K Hammond
(74) *Attorney, Agent, or Firm* — Chun-Ming Shih; Lanway IPR Services

(57) ABSTRACT

The first set of light emitting diode modules include multiple first type light emitting diode units. The first type fluorescent powder covers on the surface of multiple first type light emitting diode units. The second set of light emitting diode modules include multiple second type light emitting diode units and accessory electronic units. The second type fluorescent powder covers on the surface of multiple second type light emitting diode units. The driver circuit transfers the electricity to the first light emitting diode modules and the second light emitting diode modules to make the first light emitting diode unit and the second light emitting diode unit lighting. Moreover, the accessory electronic unit may affect the relative proportion current between the first set of light emitting diode modules and the second set of light emitting diode modules when the driver circuit supplies the different total current value.

10 Claims, 4 Drawing Sheets

LIGHTING APPARATUS AND LIGHT EMITTING MODULE

TECHNICAL FIELD

The present invention is related to a lighting apparatus and a light emitting module, and more particularly related to a lighting apparatus and a light emitting module with variable optical characteristic.

BACKGROUND

People have sensitive feeling of the lighting in thousands of evolutions. Although the popularity of lighting technology nowadays makes no difference between day and night. However, people may still affect by the characteristic of the lighting without consciousness.

For example, there is an experiment improving some of people have different concentrated attention in evening and noon. Even the medical research shows the function to release the over anxiety and insomnia through the control of the color temperature.

However, the lighting apparatus changing the characteristic of the lighting is still more expensive. If it is capable of finding a lighting apparatus with a reasonable cost and bringing the effect at the same time, it may bring a lot of help for improving the lives for people.

SUMMARY OF INVENTION

According to the present invention, the first embodiment provides a lighting apparatus. The lighting apparatus includes following units.

The first light emitting diode module includes multiple first light emitting diode units. The first fluorescent powder covers on the first light emitting diode unit.

The second light emitting diode module includes multiple second light emitting diode units and an accessory electronic units.

In view of this, it is necessary to provide the fixed structure of the light bulb shell with an automated installation. The second fluorescent powder covers on the second light emitting diode unit. The different light characteristics between the second fluorescent powder and the first fluorescent powder makes the difference light characteristics between the first light emitting diode unit and the second light emitting diode unit.

The light emitting diode has multiple ways to realize the white light. However, the earlier development and the realized way is to coat the fluorescent powder on the chip of the light emitting diode to realize the emitting shooting of the white light. The light emitting diode uses three main ways by using the fluorescent powder to realize the white light. Specifically, the first way is to coat the yellow fluorescent powder may be stimulated by for stimulating the blue light on the chip of the blue light emitting diode. The blue light comes from the chip and the yellow light comes from the fluorescent powder are complementary to be the white light. The second way is to coat the green and red fluorescent powder on the chip of the blue light emitting diode. Through the blue light comes from the chip and the green and red light come from the fluorescent powder compounded to be the white light. This makes the better color rendering. The third way is to coat three primary colors or multiple kinds of the fluorescent powder on the chip of the purple light or ultraviolet light emitting diode. Using the chip to reflect the long wave ultraviolet light (370 nm-380 nm) or purple light (380 nm-410 nm) stimulates the fluorescent powder to realize the shooting of the white light. This makes the better color rendering than the second way. Nowadays, most of the higher efficiency of the red and green fluorescent powder are sulfide system. In other words, by different ingredients of the fluorescent powder may adjust the difference characteristics of the light.

The driver circuit transfers the electricity to the first light emitting diode module and the second light emitting diode module to make the first light emitting diode units and the second light emitting diode units lighting. Moreover, the accessory electronic unit may affect the relative proportion current between first light emitting diode modules and the second light emitting diode modules when the driver circuit provides the different total current value.

In other words, in this kind of lighting apparatus, we may adjust the lighting characteristics of the first light emitting diode modules and the second light emitting diode modules by changing the brightness at the same time through the change of the whole current provided by the driver circuit.

In some embodiments, the driver circuit transforms the indoor electricity to suitable voltage ranges in driving the light emitting diode unit to provide the electricity for the first light emitting diode modules and the second light emitting diode modules.

In some embodiments, the accessory electronic unit includes resistance. In other words, this accessory electronic unit may be a resistor with a specific resistance value and a simple circuit combination including the resistor.

In some embodiments, the first light emitting diode modules also includes the supplement electrical unit. The supplement electrical unit and the accessory electronic unit have different characteristics of circuit to affect the relative proportion of current in the first light emitting diode module and the second light emitting diode modules. In other words, the supplement electrical unit and the accessory electronic unit may interact to affect the change characteristics of the light.

In some embodiments, the accessory electronic unit and the second light emitting diode unit are packaged together.

In some embodiments, the characteristic of the first spectrum and the characteristic of the second spectrum are the characteristic specially for the color temperature.

Color temperature is the physical quantity to define the light color in lighting optics. Meaning heating a blackbody to a specific temperature, and when the color of the shooting light is same as the color of the light shooting from the light source, the temperature of the heated blackbody is called the color temperature of the light source, the abbreviation is called color temperature. The unit of the color temperature is "K". (Kelvin temperature unit)

Color temperature is visible light and with important applications in photography, video, publishing and other fields. The color temperature of the light source is determined by comparing its color and theoretical hot blackbody radiators. The Kelvin temperature of the warm blackbody radiator and the color of the light source is the color temperature of the light source, which is directly related to the law of Planck's blackbody radiation.

Color temperature is the most common indicator of the spectral quality of the light source. Generally, using Tc represents the color temperature. The color temperature is defined by absolute blackbody. The absolute blackbody's radiation and the light source are exactly the same in the visible area, and the temperature of the blackbody is called the color temperature of the light source. The characteristic of the low color temperature light source is the red radiation is relatively more in the energy distribution, and often referred to as "warm light". When the color temperature increases, the proportion of blue radiation increases in the energy distribution, and often referred to as "cold light." Some of the commonly used light source color temperature are standard candle light 1930K (Kelvin temperature unit), tungsten wire light 2760-2900K, fluorescent light 6400K, flash light for 3800K, noon sun 5000K, electrical flash light 6000K, and blue sky 10000K.

In other words, we may adjust the current to change the overall color temperature of the lighting apparatus.

In some embodiments, when the driver circuit provides the different current value to the first light emitting diode modules and the second light emitting diode modules, the mixed output of the overall spectral characteristics with different current value changes because the proportion of brightness of the first light emitting diode modules and the second light emitting diode modules changes in the different speeds.

In addition, in other embodiments, the color temperature of the overall spectral characteristic transitions from high color temperature to low color temperature when the total current value changes from high to low. Further, adjusting the characteristics of the first type fluorescent powder and the second type fluorescent powder and setting the circuit characteristics of the accessory electronic unit; imitates the change of the color temperature from daytime to dusk when the total current value changes from high to low.

In a further embodiment, the driver circuit has multiple preset options corresponding to the different total current value for the user to select the different overall spectral characteristic. For example, the lighting apparatus may set several different buttons or toggle switches, allowing the user to choose the lighting needs for themselves from several preset color temperatures or other combinations of optical properties. After the selection of the user, the corresponding current produced by the driver current is capable of producing the corresponding light characteristics of lighting.

In some implementations, the driver electrical circuit having time control the electrical circuit progressively adjusts the total current value from high to low in accordance with a preset time schedule such that the overall spectral characteristics cause a predetermined change with the time schedule. In other words, the lighting apparatus may be automatically simulated over time to change the color temperature over time. Even the user may adjust this time schedule according to the needs or design requirements.

In some embodiments, the first light emitting diode modules and the second light emitting diode modules are assembled into a module having two electrodes for electrical connection to the driver circuit. The module may be an elongated strip type.

In some further embodiments, the lighting apparatus have multiple modules connected in parallel, or in series, or in series with each other in series, to the driver circuit for power supply.

In some further embodiments, the lighting apparatus further includes a bulb housing enclosing the module. Moreover, multiple modules may be arranged in a non-parallel arrangement in the accommodating space of the bulb shell. This may better handle the problem of heat dissipation and overall luminous efficiency.

According to the present invention there is also a light emitting module with the following units.

The first light emitting diode module includes multiple kinds of first type light emitting diode units. The first type of fluorescent powder covers on the surface of multiple kinds of first type light emitting diode unit.

The second light emitting diode module includes multiple kinds of second type light emitting diode units and accessory electronic units. The second type fluorescent powder covers on the surface of multiple kinds of second type light emitting diode units. The first type fluorescent powder has a different light characteristic from the second type fluorescent powder so that the first spectral characteristic of the first type light emitting diode unit is different from the second spectral characteristic of the second type light emitting diode unit.

Connecting to the driving circuit by the first electrode and the second electrode, the driving circuit supplies electricity to the first emitting diode modules and the second light emitting diode modules, so that the first type of light emitting diode unit emits light with the second type of light emitting diode unit. Multiple electronic components affect the relative current ratio received by the first light emitting diode module and the second light emitting diode modules when the driving circuit supplies a different current value.

The light emitting module may be an elongated strip type. In addition, when the driver circuit supplies a different current value to the first set of light emitting diode modules and the second set of light emitting diode modules, the first light emitting diode modules and the second light emitting diode modules make the mixed out of the overall spectral characteristics with different current values change because the proportion of brightness changes in the speed of different.

In some embodiments, the first type fluorescent powder and the second type fluorescent powder in the filament may be dried at a certain temperature of the oven and the viscosity of the fluorescent powder mixed with the first type of fluorescent powder and the second type of fluorescent powder integrate into one after baked, with characteristics of the separate fluorescent powder at the same time. In other words, in the actual operation, you may add with different fluorescent powder in the adjacent two groups of light emitting module, e.g. mixing the power by glue and heat to fuse the powder together.

In addition, in practice, the first type fluorescent powder may be superimposed on the second type fluorescent powder, while the second type fluorescent powder may only cover on the first type of light emitting diode chip. This approach allows the first type fluorescent powder to simultaneously have higher excitation efficiency on the first type of light emitting diode chip and the second type of light emitting diode chip.

According to such an embodiment, it is possible to provide a lighting apparatus having a low cost, a high stability and a versatile use, and improving the life of the person.

DETAILED DESCRIPTION

Figure 1:
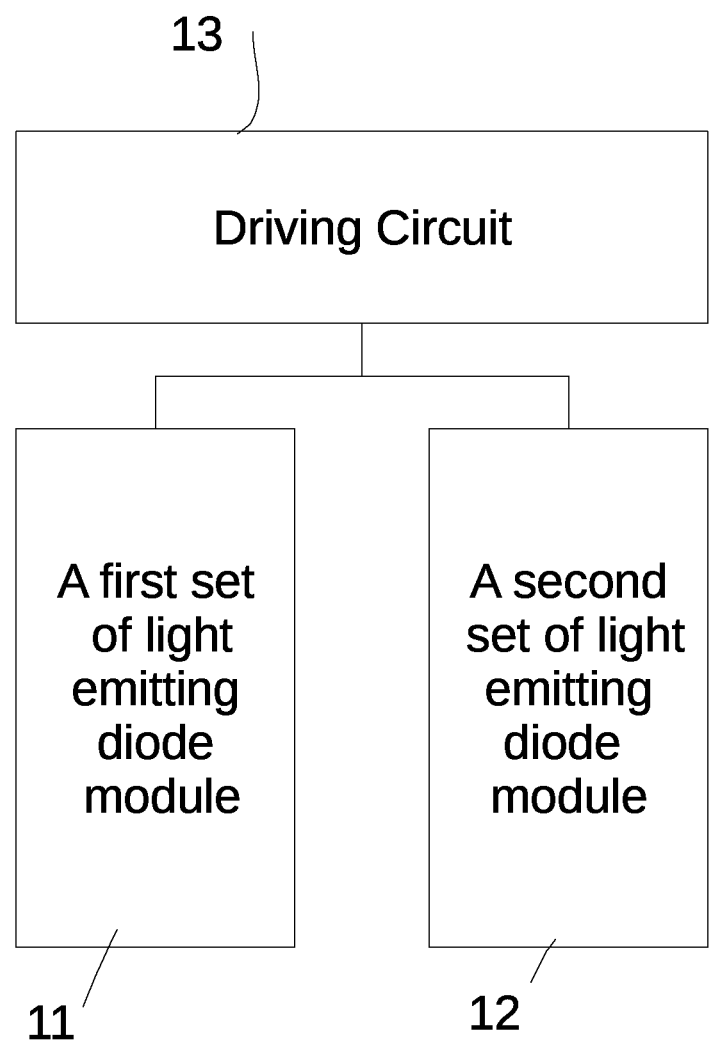
FIG. 1 is the first embodiment schematic drawing of the electrical circuit for the present invention, the lighting apparatus.

Please refer to FIG. 1. FIG. 1 illustrates a schematic diagram of a lighting apparatus electrical circuit according to the embodiment of the present invention. According to the first embodiment of the present invention, there provides a lighting apparatus. The lighting apparatus includes the following units.

The first light emitting diode module 11 includes multiple first type light emitting diodes units. The first type of light emitting diode unit is covered by the first type of fluorescent powder.

The second light emitting diode module 12 includes multiple second type light emitting diode units and multiple electronic units. The second type of light emitting diode unit is covered by the second type of fluorescent powder. The second type of fluorescent powder have different light characteristics from the first type of fluorescent powder so that the first spectral characteristic of first type of light emitting diode unit is different from the second spectral characteristic of second type of light emitting diode unit.

Light emitting diode owns variety ways to achieve white light, and the earlier development, has been achieved in the way of industrialization is coated with fluorescent powder on the LED chip to achieve white light emission. There are three main methods for light emitting diodes using fluorescent powder to achieve white light. Specifically, the first method is in the blue light emitting diode chip may be coated with blue light may be stimulated by the yellow fluorescent powder, the blue light emitting by the chip and the yellow light complementary to the formation of white light. The second method is the blue light emitting diode chip coated with green and red fluorescent powder, through the chip issued by the blue light and the green and red light from the fluorescent powder composite white light, the color rendering is better. The third method is to coat fluorescent powder or variety of colors on a violet or UV light-emitting diode chip, and use the long-wave ultraviolet light (370 nm-380 nm) or violet (380 nm-410 nm) powder to achieve white light emission, the color rendering is better than the second method. At present, the conversion efficiency of red and green fluorescent powder is mostly sulfide system. In other words, different light characteristics may be adjusted by different fluorescent powder components.

The driver circuit 13 supplies the electricity to the first light emitting diode module 11 and the second light emitting diode module 12 such that the first type of light emitting diode units and the second type of light emitting diode units emit light. In addition, the accessory electronic unit affects the relative current ratio received by the first light emitting diode module 11 and the second light emitting diode module 12 when the driver circuit supplies a different current value.

In other words, in such a lighting apparatus, we may adjust the lighting characteristics of the first light emitting diode module 11 and the second light emitting diode module 12 by varying the total current supplied by the driver circuit 13 and different brightness changing speeds.

Figure 2:
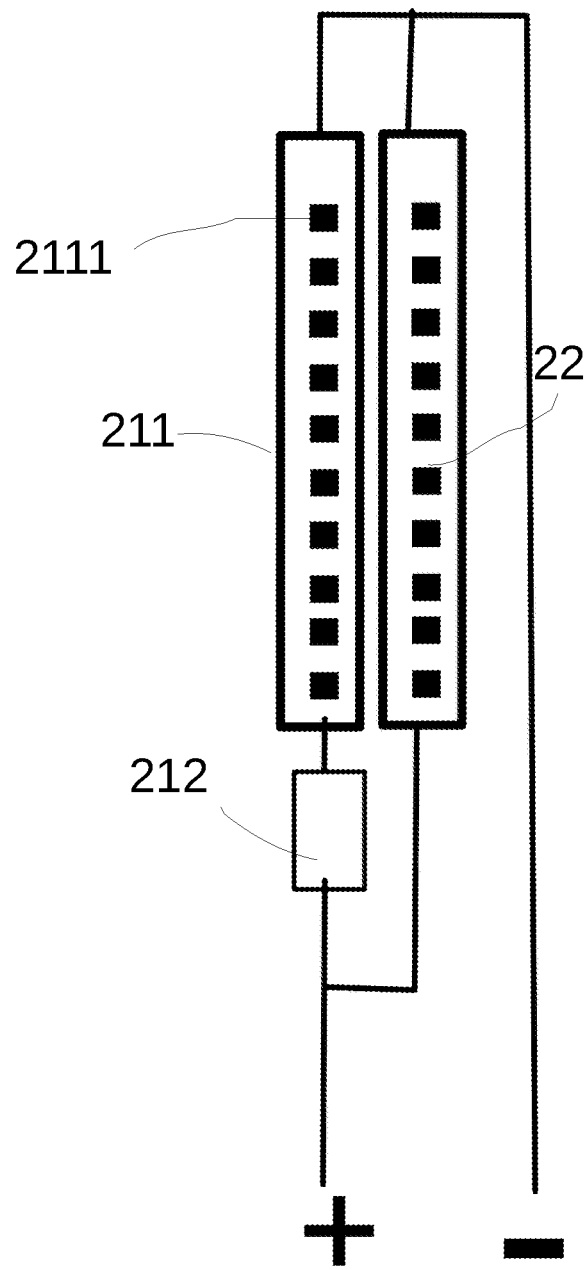
FIG. 2 is the schematic drawing of the unit that illustrates the lighting apparatus.

Please refer to FIG. 2. FIG. 2 is the schematic drawing of the unit that illustrates the lighting apparatus.

FIG. 2 is the schematic drawing of a light emitting module group, may be made into a module unit. The light emitting module group has a first light emitting diode module on which multiple first type light emitting diode units 2111 are arranged in a module 211. This module is further connected in series with accessory electronic unit 212. The light emitting module group also has a second light emitting diode module 22. The first set of light emitting diode module and the second set of light emitting diode module in parallel, and together receive the external driver circuit from the current.

Figure 3:
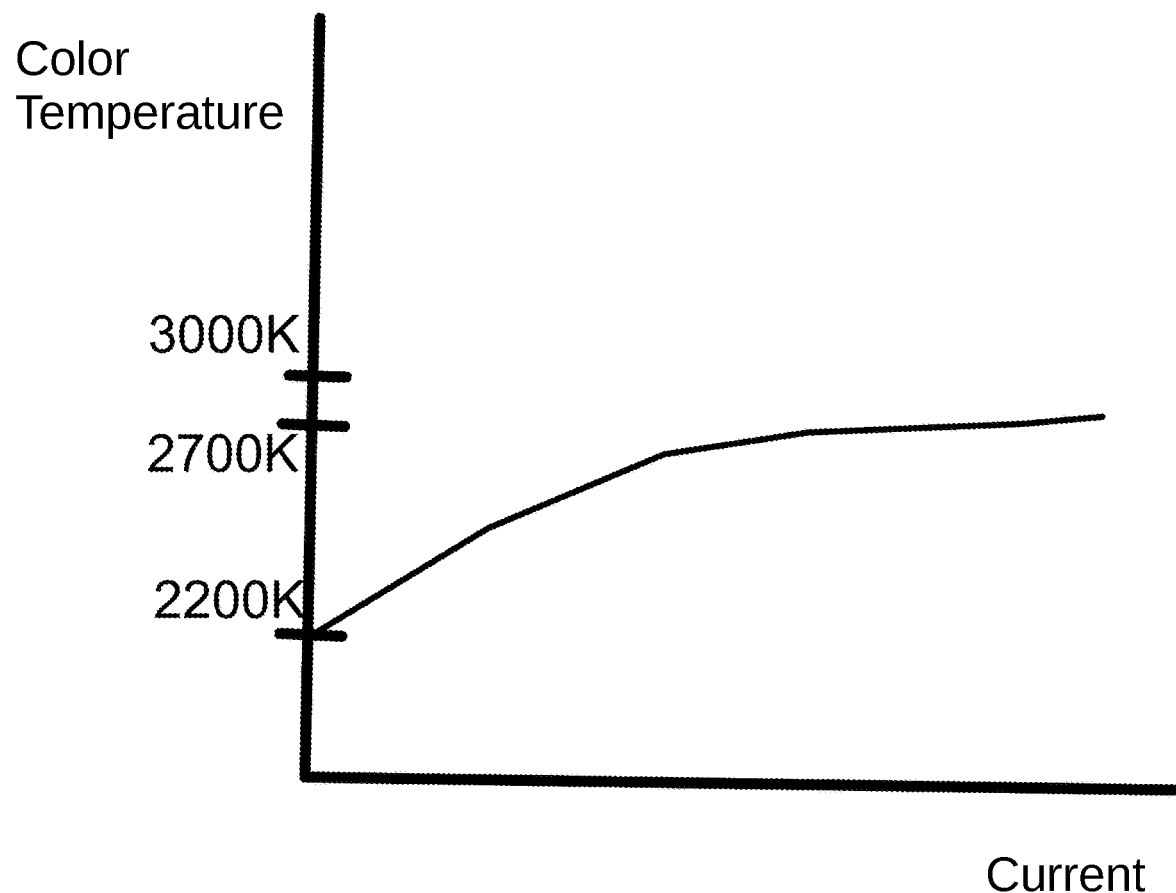
FIG. 3 is the changing drawing of current that illustrates the color temperature.

Please refer to FIG. 3. FIG. 3 is the changing drawing of current that illustrates the color temperature. As described above, when we set the characteristics of the first light emitting diode module and the second light emitted diode module by adjusting the characteristics of the fluorescent powder, we may set the color temperature of the first light emitting diode module and the second light emitting diode module. In addition, by adjusting the circuit characteristics of the accessory electronic units, we may further adjust the relative ratio of the first light emitting diode module and the second light emitting diode module. FIG. 3 illustrates how a mixed color temperature changes for the first set of LED module and the second set of LED module via adjusting a total current supply of the driver circuit.

In some embodiments, the driver circuit converts the indoor power source into a voltage range suitable for driving the diode light emitting unit to power the first light emitting diode module and the second light emitting diode module.

In some embodiments, the accessory electronic unit includes a resistor. In other words, the accessory electronic unit may be a resistor having a specific resistance value, or it may be a simple circuit combination including a resistor.

In some embodiments, the first light emitting diode module also includes supplemental electronic units. The complementary electronic unit has different circuit characteristics from accessory electronic unit and affects the relative current ratio received by first light emitting diode module and second light emitting diode module. In other words, the supplemental electronic unit and the accessory electronic unit may alternately affect the final light change characteristic.

In some embodiments, the accessory electronic unit is packaged with the second light emitting diode unit.

In some embodiments, the first spectral characteristic and the second spectral characteristic are optical properties for color temperature.

Color temperature is a physical quantity used in lighting optics to define the color of the light source. That is, a black body heated to a temperature, the light emitting by the color and the light emitting by a light source of the same color, the black body heating temperature is called the color temperature of the light source, referred to as color temperature. The unit is expressed in "K" (Kelvin temperature unit).

Color temperature is visible light in photography, video, publishing and other fields with important applications. The color temperature of the light source is determined by comparing its color and theoretical hot blackbody radiators. The temperature of the warm blackbody radiator and the color of the light source is the color temperature of the light source, which is directly related to the law of Planck's blackbody radiation.

Color temperature is the most common indicator of the spectral quality of the light source. Generally used Tc said. The color temperature is defined by absolute blackbody, and the absolute blackbody's radiation and the light source are exactly the same in the visible area, and the temperature of the blackbody is called the color temperature of the light source. Low color temperature light source is characterized by the energy distribution, the red radiation is relatively more, often referred to as "warm light"; color temperature increases, the energy distribution, the proportion of blue radiation increases, often referred to as "cold light." Some of the commonly used light source color temperature: standard candle for the 1930K (Kelvin temperature unit); tungsten wire for the 2760-2900K; fluorescent lamp 6400K; flash for the 3800K; noon sun 5000K; electronic flash for 6000K;

In other words, we may adjust the current to change the overall color temperature of the fixture device.

In some embodiments, when the driver circuit supplies a different current value to the first light emitting diode module and the second light emitting diode module, because the brightness changes in different speeds on the first set of light emitting diode module and the second set of light emitting diode module, such design makes the mixed output with different overall spectral characteristics under different current values.

In addition, in further embodiments, the color temperature of the overall spectral characteristic transitions from high color temperature to low color temperature when the total current value changes from high to low. Further, by adjusting the characteristics of the first type fluorescent powder and the second type fluorescent powder and setting the circuit characteristics of the accessory electronic unit, when the total value of the current becomes high, simulated the changes of color temperature changes from daytime to dusk.

In a further embodiment, the driver circuit has multiple preset options corresponding to a different total current value for the user to select a different overall spectral characteristic. For example, the lighting apparatus may set several different buttons or toggle switches, allowing the user to choose the lighting needs they need from several preset color temperatures or other combinations of optical properties. In the user selected, the driver current to produce the corresponding current is able to produce the corresponding light characteristics of lighting.

In some implementations, the driver circuit has a time control circuit that progressively adjusts the total current value from large to small in accordance with a preset time schedule such that the overall spectral characteristics cause a predetermined change with the time schedule. In other words, the lighting apparatus may be automatically simulated over time to change the color temperature over time. Even the user may adjust this time schedule according to the needs or design requirements.

In some embodiments, the first light emitting diode module and the second light emitting diode module are assembled into a module having two electrodes for electrical connection to the driver circuit. The module block may be an elongated strip type.

Figure 4:
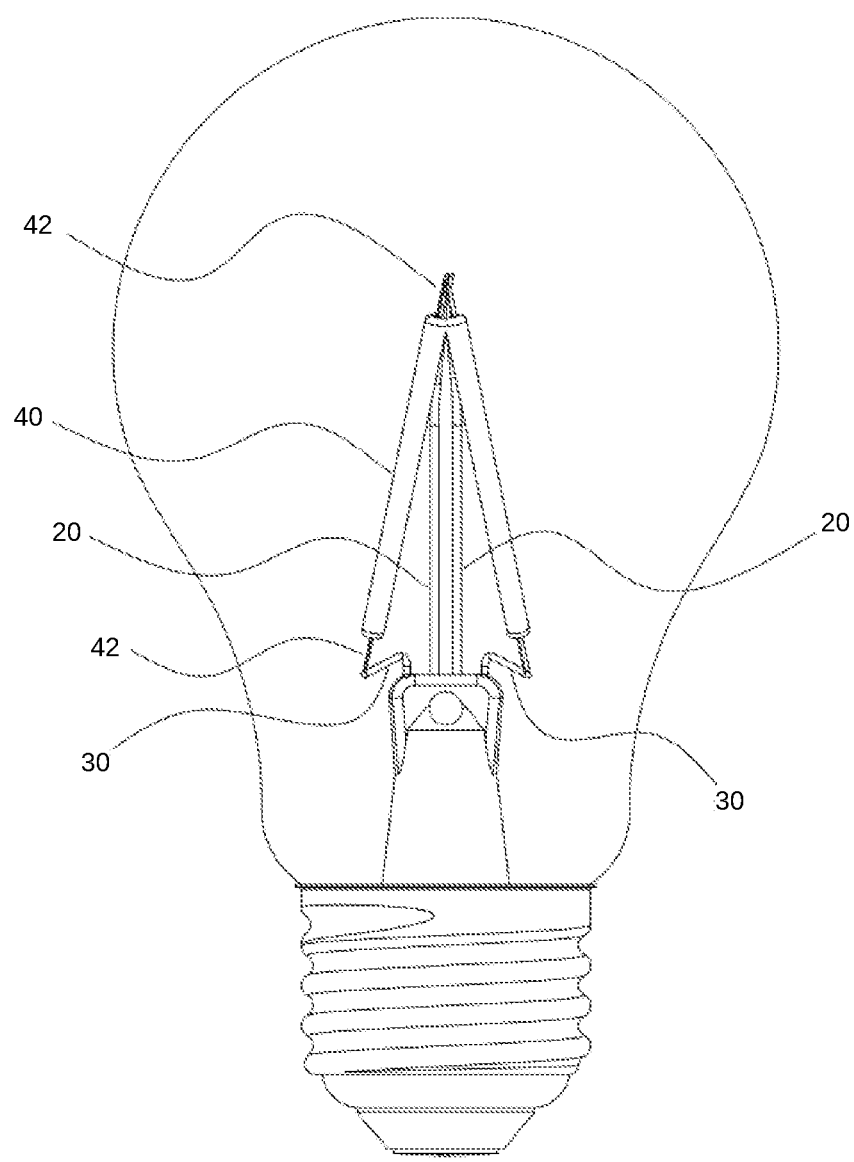
FIG. 4 is the schematic drawing that illustrates another embodiment.

Please refer to FIG. 4. An embodiment of a bulb is illustrated. In this embodiment, the above-described module group 40 is the elongated type. Multiple module groups 40 are connected to the corresponding driver circuit through wires 42, and multiple module groups 40 are supported by a transparent stem 20 are connected in series at the top portion 42.

The bulb shell covers these modules 40. Multiple modules 40 are arranged in a non-parallel arrangement in the accommodating space of the bulb shell. This may better handle the problem of heat dissipation and overall luminous efficiency.

According to the present invention there also provides a light emitting module having the following units.

The first light emitting diode module includes multiple first type of light emitting diode units. The first type fluorescent power covers on the surface of multiple of first light emitting diode units.

The second light emitting diode module includes multiple second type of light emitting diode units and accessory electronic units. The second type of fluorescent power covers on the surface of multiple second type of light emitting diode units. The second type of fluorescent powder has different light characteristics from first type of fluorescent powder so that the first spectral characteristic of first type of light emitting diode unit is different from the second spectral characteristic of second type of light emitting diode unit.

A first electrode and a second electrode are connected to the driver circuit through the first electrode and the second electrode, and the driver circuit is supplied to the first group of the light emitting diode modules and the second light emitting diode modules so that the first type. The light emitting diode unit emits light with the second type of light emitting diode unit. And accessory electronic unit affects the relative current ratio received by the first light emitting diode module and the second light emitting diode module when the driver circuit supplies a different current value.

The light emitting module may be an elongated strip type. In addition, when the driver circuit supplies a different current value to the first light emitting diode modules and the second light emitting diode modules, the first light emitting diode modules and the second light emitting module make a mixed output of different overall spectral characteristics under different current values.

In addition, in some embodiments, the first type of fluorescent powder and the second type of fluorescent powder in the filament may be dried at a certain temperature of the oven and the viscosity of the fluorescent powder mixed with the first class of fluorescent powder and the second type. The fluorescent powder is dried and melted together with independent characteristic of fluorescent powder at the same time. In other words, in the actual operation, you may add with different fluorescent powder in the adjacent two groups of light emitting diode module and mixed by glue and heat together to be fused together.

In addition, in practice, the first type of fluorescent powder may be superimposed on the second type of fluorescent powder, while the second type of phosphor may only cover the first type of light emitting diode chip. This approach allows the first type of fluorescent powder to simultaneously have higher excitation efficiency on the first type of light emitting diode chip and the second type of light emitting diode chip.

In addition to the above examples, other modifications and variations are intended to be within the scope of the present invention as defined by the appended claims.

The invention claimed is:

1. A lighting apparatus comprising:
   a first light emitting diode module comprising a plurality of first type light emitting diode units, and a first type fluorescent powder covering a surface of the plurality of first type light emitting diode units;
   a second light emitting diode module comprising a plurality of second type light emitting diode units and a resistor connected in series, a second type fluorescent powder covering a surface of the plurality of second type light emitting diode, the first type fluorescent powder having a different light characteristic from the second type fluorescent powder so that a first spectral characteristic of the first type light emitting diode units is different from a second spectral characteristic of the second type light emitting diode unit; and
   a driver circuit for supplying electricity to the first light emitting diode module and the second light emitting diode module so as to drive the first type light emitting diode units and the second type light emitting diode units to emit light, and the resistor determining a relative electrical current ratio for currents received between the first light emitting diode module and the second light emitting diode module when the driver circuit supplies a different total current value, wherein the first type fluorescent powder and the second type fluorescent powder are combined together by a glue.

2. The lighting apparatus of claim 1, wherein the driver circuit converts an indoor power source into a voltage range suitable for driving power to the first light emitting diode module and the second light emitting diode module.

3. The lighting apparatus of claim 1, wherein the resistor is packaged with the second type light emitting diode unit.

4. The lighting apparatus of claim 1, wherein the first spectral characteristic and the second spectral characteristic are optical properties for color temperature.

5. The lighting apparatus of claim 1, wherein an overall color temperature of the first light emitting module and the second light emitting module is changed from a high color temperature to a low color temperature when the total current value is decreased.

6. The lighting apparatus of claim 1, wherein the driver circuit has a plurality of preset options corresponding to different total current values.

7. The lighting apparatus of claim 1, wherein the driver circuit has a time control circuit that progressively adjusts the total current value in accordance with a preset time schedule.

8. The lighting apparatus of claim 1, wherein the first light emitting diode module and the second light emitting diode module are assembled into a module having two electrodes for electrical connection to the driver circuit.

9. The lighting apparatus of claim 8, wherein the module is elongated strip module.

10. The lighting apparatus of claim 9, wherein a bulb shell covers the module.

* * * * *